United States Patent [19]

Havukainen

[11] Patent Number: 4,925,526
[45] Date of Patent: May 15, 1990

[54] TUBE-TYPE EVAPORATOR

[75] Inventor: Reino I. Havukainen, Varkaus, Finland

[73] Assignee: A. Ahlstrom Corporation, Karhula, Finland

[21] Appl. No.: 253,407

[22] Filed: Oct. 3, 1988

Related U.S. Application Data

[63] Continuation of Ser. No. 66,253, Jun. 25, 1987, abandoned.

[30] Foreign Application Priority Data

Jun. 25, 1986 [FI] Finland .................................. 862703

[51] Int. Cl.⁵ ........................... B01D 1/22; B01D 3/04
[52] U.S. Cl. .................................. 159/13.3; 159/27.1; 159/28.3; 159/43.1; 159/49; 159/901; 165/115; 202/236; 202/237; 203/89
[58] Field of Search ...................... 159/43.1, 901, 13.3, 159/27.1, 27.4, 28.3, DIG. 34, 49, 28.5; 202/236, 237; 203/89; 165/115; 122/39; 162/233

[56] References Cited

U.S. PATENT DOCUMENTS

| | | | |
|---|---|---|---|
| 351,796 | 11/1886 | Rice | 159/28.3 |
| 389,075 | 9/1888 | Hayes | 159/28.5 |
| 1,770,320 | 7/1930 | Morterud | 159/28.3 |
| 2,392,255 | 1/1946 | McAndrews | 159/28.3 |
| 4,216,002 | 8/1980 | Rosenblad | 159/13.3 |
| 4,422,899 | 12/1983 | Juhola et al. | 159/13.3 |

FOREIGN PATENT DOCUMENTS

| | | | |
|---|---|---|---|
| 737330 | 6/1943 | Fed. Rep. of Germany . | |
| 52601 | 6/1978 | Finland . | |
| 50-35506 | 11/1975 | Japan | 159/28.5 |
| 0392948 | 12/1973 | U.S.S.R. | 159/13.3 |
| 0010103 | 1/1905 | United Kingdom | 159/28.3 |
| 0432938 | 8/1935 | United Kingdom | 159/28.3 |

*Primary Examiner*—Virginia Manoharan
*Attorney, Agent, or Firm*—Toren, McGeady & Associates

[57] ABSTRACT

A falling film evaporator having vertical outer tubes with closed upper ends connected to an upper tube plate disposed in the lower region of the evaporator. Other parallel tubes are disposed inside the outer tubes and are connected to a lower tube plate under the upper tube plate. The evaporator also has a mechanism for distributing the material to be evaporated onto the upper ends of the outer tubes in such a way that the material flows down along the tubes and forms a film on the external surface of the tubes. The space between the tube plates, in which the ends of the outer pipes are located, is divided by an intermediate wall into an inlet and an outlet compartments. Heating steam is fed to the inlet compartment. Clean condensate is recovered from the inlet compartment and contaminated condensate from the outlet compartment.

3 Claims, 1 Drawing Sheet

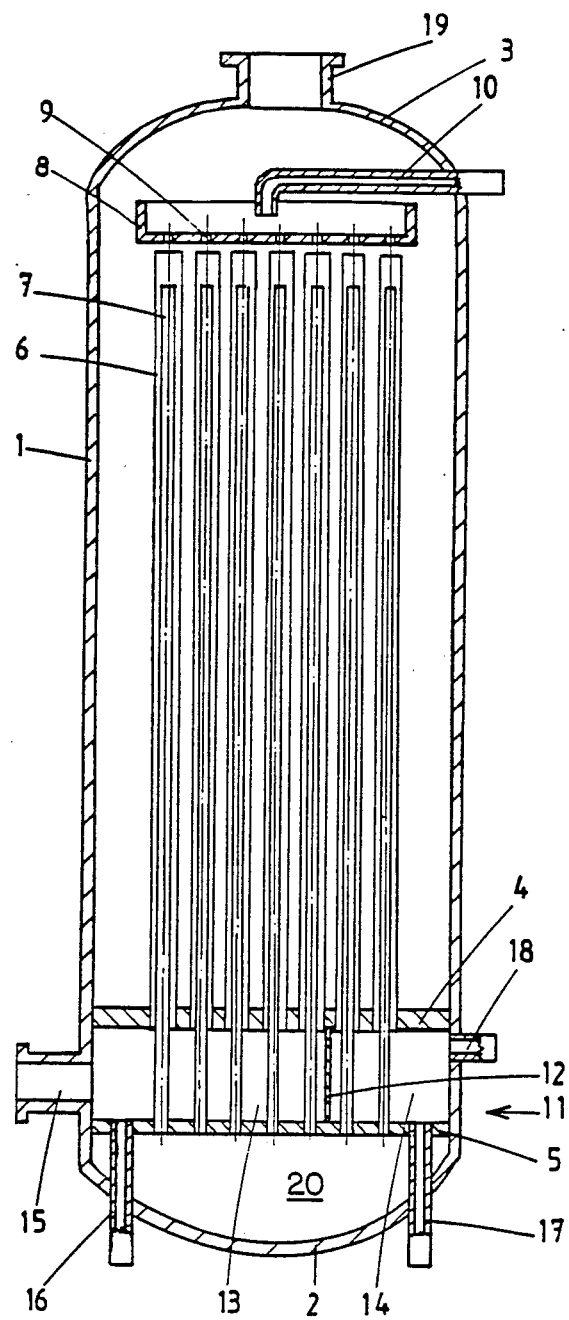

TUBE-TYPE EVAPORATOR

This is a continuation of application Ser. No. 066,253 filed June 25, 1987, now abandoned.

FIELD AND BACKGROUND OF THE INVENTION

The present invention relates to an evaporator comprising upwardly or vertically extending outer tubes having closed upper ends and being connected to a tube plate in a lower region of the evaporator. Inside these tubes there are other normally parallel tubes connected to another tube plate which is disposed below the said tube plate. The upper region of the evaporator is provided with means for feeding the material to be evaporated to the upper ends of the outer tubes so that the material flows down along the outer tubes forming a falling film on the outer surface of the outer tubes. An inlet and outlets are provided for the material delivering heat in a lower region of the evaporator.

A double-tube falling film evaporator is disclosed in German patent publication no. 737330. In the apparatus of this publication the material delivering heat is fed to a space under a lower tube plate from which it flows in an inner tube to the internal surface of an outer tube to which it delivers heat which is used for evaporating material flowing down along the external surface of the tube. One of the advantages of this construction is that the heat exchanger tube is connected to only one tube plate and thus is not subjected to stresses as the tubes in a conventional tube-type evaporator. Further, only one of the tube plates, viz. the upper one, has to face the pressure difference prevailing in the evaporator and not both the tube plates as in a conventional tube-type evaporator.

SUMMARY OF THE INVENTION

It is an object of the invention to provide an evaporator which can be used when the steam delivering heat is contaminated such as the expansion steam from a cellulose digester.

In the apparatus according to the present invention, the condensate can be divided in two portions one of which, viz. the smaller portion, contains the main part of the volatiles and the other one, viz. the larger portion, is clean and can be recovered.

An evaporator according to the invention is characterized in that the space between the tube plates in which the ends of most of the tubes are located is divided by an intermediate wall into two compartments. Condensate is discharged from both of the compartments and one of them is connected to the inlet for the steam delivering heat.

The construction is clearly simpler than e.g. the twostaged lamella-type evaporator disclosed in Finnish patent specification no. 52601.

BRIEF DESCRIPTION OF THE DRAWING

The invention will be described further, by way of an example, with reference to the accompanying drawing which is a schematic vertical section through a tube evaporator.

DESCRIPTION OF THE PREFERRED EMBODIMENT

A tube-type evaporator illustrated in the drawing comprises a vessel formed by a vertical tubular wall 1 and two convex ends 2 and 3. Two spaced apart tube plates 4 and 5 are disposed in the vessel close to the bottom end of the evaporator. A plurality of vertical tubes 6 are disposed inside the vessel with the upper ends of the tubes being closed and the lower ends being connected to the upper tube plate 4. Inside the outer tubes 6 there are other, parallel inner tubes 7 which extend towards the upper end of the outer tubes 6 and both ends of each of which tubes 7 are open with the lower ends being connected to the lower tube plate 5. A distributor 8 for liquid to be evaporated is provided in the evaporator close to its upper end. The bottom of the distributor 8 has a plurality of apertures 9 through which the material to be evaporated, e.g. lye, is evenly distributed onto the upper ends of the outer tubes 6 which serve as heat exchange surfaces and wherefrom the material flows down along the tubes and forms a thin film on the other surface of the tubes. The material to be evaporated is fed to the distributor via a pipe 10 through the wall of the vessel.

A space 11 between the tube plates 4 and 5 is divided into two compartments 13 and 14 by an intermediate wall 12. Heating steam is fed to inlet compartment 13 via an inlet 15. Condensate is discharged from both of the compartments via pipes 16 and 17. Steam flows at first to the outer tubes whose lower ends open into the compartment 13. The steam rises up to the top ends of the tubes 6 and condenses while delivering heat to the evaporating lye. The condensate is not totally condensed in this part of the evaporator. The portion of the steam which has not condensed is fed via inner tubes 7 to a return chamber 20 underneath the lower tube plate 5 and up the other inner tubes 7 and then down the inside of said outer tubes 6 which open in the outlet compartment 14 where the final condensation of the steam takes place. When heating material containing volatiles is used, e.g. lye steams, a major portion of the condensate is recovered clean as the steam rising up against the condensate flowing down in the heat exchanger tube 6 is the first part of the evaporator strips the condensate whereby the condensate is cleaned. The clean condensate is discharged from the evaporator via pipe 16 and the contaminated condensate via pipe 17 and the gases, which have not condensed, from the compartment 14 via pipe 18.

The steam generated by evaporation during the mentioned condensation is discharged via an outlet 19 in the top end 3 of the vessel.

The invention is not limited to the embodiments described here as an example only but it can be modified and applied in various ways within the scope of protection defined by the appended patent claims.

I claim:

1. An evaporator comprising:
a vessel having an upper end and a lower end;
first and second spaced apart tube plates extending across said vessel adjacent said lower end thereof and defining a space therebetween, said first tube plate being above said second tube plate;
an intermediate wall connected to and extending between said first and second tube plates and dividing said space into an inlet compartment on one side of said intermediate wall and an outlet compartment on an opposite side of said intermediate wall;
a plurality of outer tubes having open lower ends connected to said first tube plate, said outer tubes extending in said vessel and having upper closed ends;

a plurality of inner tubes extending in said outer tubes, said inner tubes having open lower ends connected to said second tube plate and open upper ends spaced below said closed upper ends of said outer tubes wherein a number of said inner and outer tubes are connected to said inlet compartment and the remainder are connected to said outlet compartment;

a return chamber below said second tube plate communicating with said open lower ends of said inner tubes;

feed means comprising a distributor extending across said vessel above said upper closed ends of said outer tubes, said distributor having apertures therethrough for discharging material to be evaporated to form films of material on the outer surfaces of said outer tubes, and a feed pipe extending into said vessel above said distributor for supplying material to be evaporated to said distributor;

means for feeding heating steam to the inlet compartment of said vessel which steam travels from said inlet compartment upwardly through a passage between said inner and outer tubes to form condensate which flows down the passage and is cleaned by the upwardly moving heating steam from said inlet compartment, said heating steam thereafter flowing downwardly through said inner tubes of said inlet compartment, across said return chamber and upwardly through said inner tubes of said outlet compartment, the heating steam thereafter flowing downwardly through a passage between said inner and outer tubes of said outlet compartment to form contaminated condensate which flows into said outlet compartment along with an uncondensed gas;

a first condensate outlet means for discharging condensate from said inlet compartment;

a second condensate outlet means for discharging condensate from said outlet compartment;

a gas outlet means for discharging the uncondensed gas from said outlet compartment; and a steam outlet means for discharging steam at the top end of said vessel.

2. An evaporator according to claim 1, wherein said first and second condensate outlet means are connected through said vessel and to said second tube plate.

3. An evaporator according to claim 2, wherein said vessel has a tubular wall with convex top and bottom ends covering said upper and lower ends of said vessel.

* * * * *